United States Patent [19]
El-Shall et al.

[11] Patent Number: 5,580,655
[45] Date of Patent: Dec. 3, 1996

[54] SILICA NANOPARTICLES

[75] Inventors: Mohamed S. S. El-Shall, Richmond, Va.; Daniel Graiver; Udo C. Pernisz, both of Midland, Mich.

[73] Assignee: Dow Corning Corporation, Midland, Mich.

[21] Appl. No.: 398,268

[22] Filed: Mar. 3, 1995

[51] Int. Cl.⁶ .......................................... B32B 5/16
[52] U.S. Cl. ..................... 428/402; 423/335; 423/336; 428/688
[58] Field of Search ...................... 428/402, 688, 428/202, 98; 423/335, 336; 501/4, 133

[56] References Cited

U.S. PATENT DOCUMENTS

| | | | |
|---|---|---|---|
| 4,855,205 | 8/1989 | Saha et al. | 430/106.6 |
| 4,857,289 | 8/1989 | Nauroth et al. | 423/339 |
| 5,304,364 | 4/1994 | Costa et al. | 423/338 |
| 5,318,833 | 6/1994 | Fujimoto et al. | 428/304.4 |

OTHER PUBLICATIONS

The Journal of Chemical Physics, vol. 52, No. 9, May 1, 1970, pp. 4733–4748.
The Journal of Physical Chemistry, vol. 98, No. 12, Mar. 24, 1994, pp. 3067–3070.

*Primary Examiner*—H. Thi Le
*Attorney, Agent, or Firm*—James L. DeCesare

[57] ABSTRACT

A web-like nanoparticle silica is produced by laser vaporization of silicon metal in a helium/oxygen atmosphere in a diffusion cloud chamber where it aggregates into novel web-like microstructures. The aggregates are porous and have a surface area greater than 300 $m^2/g$. Bright blue photoluminescence from the web-like nanoparticle silica is observed upon irradiation with ultraviolet light.

2 Claims, 2 Drawing Sheets

SILICA NANOPARTICLES

BACKGROUND OF THE INVENTION

This invention is directed to silica nanoparticles agglomerated into a three-dimensional web-like structure. The silica is obtained by laser ablation of a silicon metal target in an oxygen-containing atmosphere. The morphology consists of agglomerated nanoparticles about 10–20 nanometers (nm) in diameter, which are fused together into an open three-dimensional network with high surface area.

The synthesis and characterization of nanoparticles has received attention in recent years for their use as catalysts. Silica nanoparticles are materials with many applications since silica is inherently thermally stable. Furthermore, the morphology of amorphous silica powders and porous gels is of interest for improving mechanical and electrical properties of materials where silica is used.

A range of nanoparticles has been produced by chemical and physical methods. The most common physical methods involve gas condensation techniques where oven sources are used to produce metal vapors. In spite of success with this method, there are still problems and limitations, such as reactions between metal vapors and oven materials, inhomogeneous heating of the source limiting control of particle size and distribution, incomplete vaporization of refractory metals due to low vapor pressure, and range of control of the composition of the mixed metal particles due to the difference in composition between the alloys and the mixed vapors.

The advantages over other heating methods which laser vaporization techniques provide are the production of high density metal vapor within a short time ($10^{-8}$s), the generation of directional high speed metal vapor from a solid target for directional deposition of the particles, and control of evaporation from specific spots on a target as well as simultaneous or sequential evaporation of several different targets. Some of these advantages have been demonstrated in the synthesis of ultrafine metal particles, but control of the nucleation process which strongly affects particle size, composition, and morphology of the deposited material, has not yet been achieved.

According to the present invention, we have discovered a new form of silica in which nanoparticles aggregate into a unique web-like microstructure. This web-like nanoparticle silica exhibits blue photoluminescence upon irradiation with ultraviolet light. The web-like nanoparticle silica with controlled size and composition is synthesized with a technique that combines the advantages of pulsed laser vaporization with controlled condensation in a diffusion cloud chamber under well defined conditions of temperature and pressure. The various forms of nanoparticle silica according to the invention are suitable for use in building non-linear optical devices employed in the communications industry, and for building flat-panel displays.

SUMMARY OF THE INVENTION

The invention relates to nanoparticle silica exhibiting blue photoluminescence upon irradiation with ultraviolet light and which is generally in the form of a three-dimensional web-like microstructure. The nanoparticles have a surface area (BET method) of between about 380–460 $m^2/g$, a particle diameter of between about 10–20 nanometers, and a photoluminescence spectrum exhibiting one peak at about 422 nm (2.94 eV) and another peak at about 467 nm (2.65 eV).

These and other features of the invention will become apparent from a consideration of the following description.

BRIEF DESCRIPTION OF THE DRAWINGS

FIG. 2 shows a unique agglomerate pattern of particles which appears as a web-like matrix. A decrease in the temperature gradient between chamber plates results in larger particle sizes. The web-like array shown in FIG. 2 has spacing between branches of about one micron. The porous arrangement of aggregates and corresponding interchain spacing reveals a superstructure pattern of alternating areas of particles and holes.

DETAILED DESCRIPTION OF THE INVENTION

Figure 1:
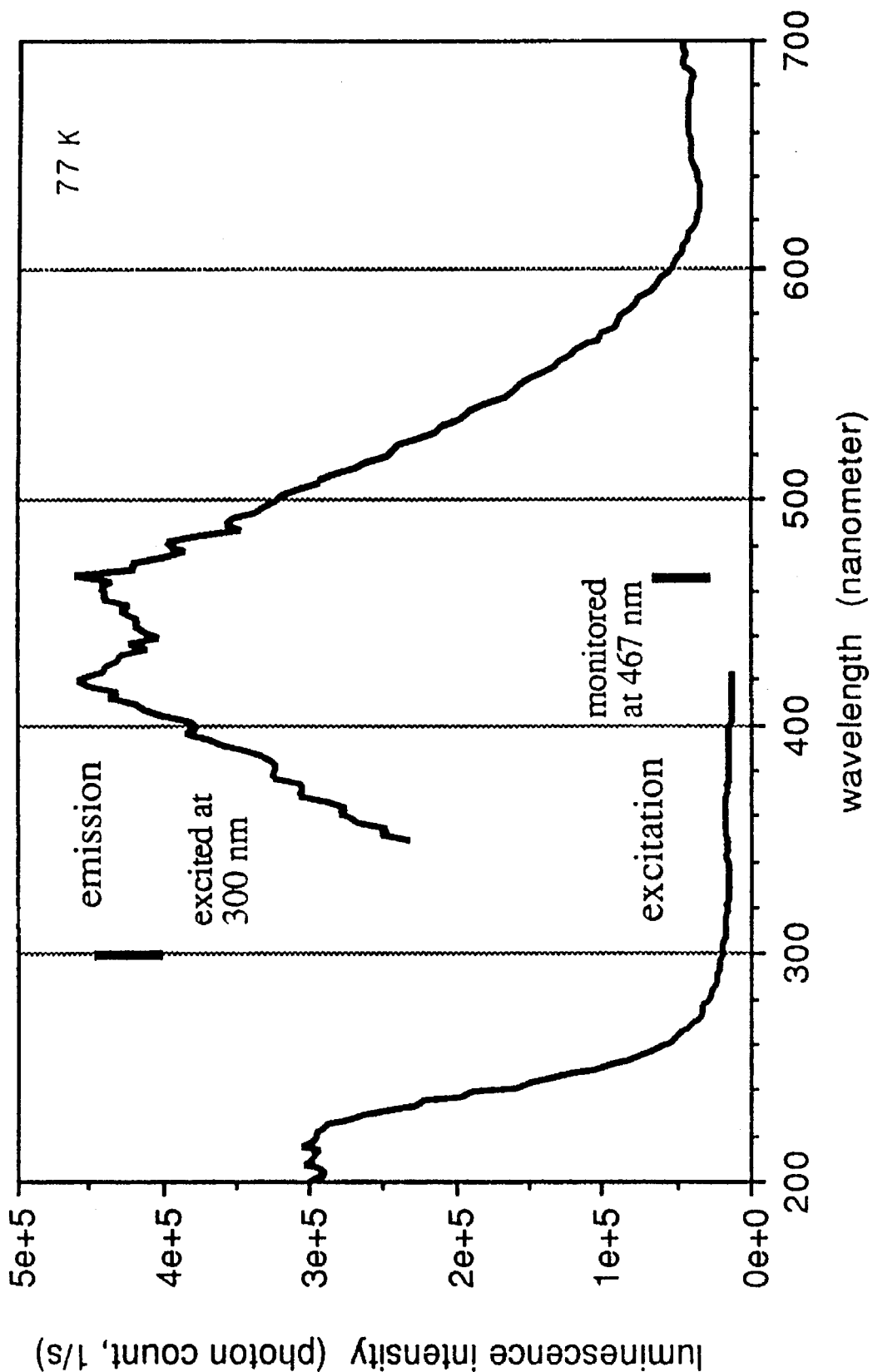
FIG. 1 is a graphical representation of the photoluminescence spectra of the nanoparticle silica according to the present invention. The left trace is the excitation spectrum monitored at 467 nm (2.65 eV). The right trace is the emission spectrum excited with 300 nm light. The monitor and excitation wavelengths are marked by vertical bars.

According to the invention, new photoluminescent web-like nanoparticle silica is obtained and synthesized by combining laser vaporization of a metal with controlled condensation from the vapor phase in a modified upward thermal diffusion cloud chamber. A silicon metal vapor is generated in the chamber by pulsed laser vaporization of a silicon metal target in the presence of an inert carrier gas and a reactant gas such as oxygen. Silica nanoparticles are formed on a cold plate in the chamber.

The web-like nanoparticle silica is made according to a method in which silicon metal is placed in the lower portion of a chamber and subjected to a pulsed laser in the presence of an oxygen containing inert carrier gas. Silicon metal vapor is generated in the chamber as a result of the pulsed laser vaporization. Energetic silicon metal atoms and clusters are allowed to react with oxygen present in the chamber to form vapor phase silicon metal oxide molecules in the chamber as a result of the reaction. The vapor phase silicon metal oxide molecules and clusters are cooled with the carrier gas, and then form silica nanoparticles which are condensed in the upper portion of the chamber on a cold plate.

X-ray diffraction of these silica nanoparticles prepared by using 20% oxygen in helium reveal an amorphous pattern similar to commercial fumed silia. The chemical composition of the particles was examined using Fourier transform infrared spectroscopy (FTIR). The spectrum shows strong absorption bands associated with characteristic stretching, bending, and wagging vibrations of silica groups. It is known in the art that vibrational frequencies characteristic for silica occur at 1090, 800, and 470 cm$^{-1}$, with a broad band centered around 3450 cm$^{-1}$. The material prepared according to this invention also displays these vibrational frequencies.

In particular, a band at 957 cm$^{-1}$, which can only be seen in bulk analyses if the specific surface area of silica is high, was observed in the sample. This band is related to surface silanols and assigned to the (Si—O) stretching vibration in the Si—OH surface groups. Infrared surface analysis indicated that all Si—OH groups were located on the surface of the nanoparticle structure.

For infrared surface analysis, the spectra were recorded on pure powder pellets. In order to obtain information on the surface sites of the nanoparticles, the analysis was conducted before and after particle activation. The activation process consisted of heating the sample at 870 K. (600° C.) under dynamic vacuum for two hours. After activation, all physisorbed species including water had disappeared, and only free silanols remained. The absorption frequency of this species is located at 3747 cm$^{-1}$. On the activated sample, there was conducted an isotopic exchange by deuterium addition at 870 K. This exchange proceeds only on surface species containing hydrogen atoms. As a result, their vibrational frequencies shift toward lower values. It was determined that all silanol groups were exchanged as soon as the deuterium was added. This observation provides evidence that all Si—OH groups were accessible to deuterium, hence they are located on the surface.

The surface area of these particles depends on experimental parameters of the synthesis, and values between 380–460 m$^2$/g were determined by Brunauer-Emmett-Teller (BET) nitrogen adsorption. This is a standard technique for determining specific surface area, and is described in numerous texts including JOURNAL OF THE AMERICAN CHEMICAL SOCIETY, Volume 60, Page 309, (1938). For purposes of comparison, the largest surface area of commercial fumed silica has a surface area (BET method) of only 300 m$^2$/g and a nominal particle diameter of 7 nm.

A striking feature of the web-like nanoparticle silica of the invention is that it exhibits bright blue photoluminescence (PL) upon irradiation with ultraviolet light. The observation was made with a pulsed nitrogen laser ($\lambda$=337 nm, 0.12 mJ per pulse, 10 pulses per sec.). Under these conditions, the PL was clearly visible in room light. The photoluminescence emitted by the nanoparticle silica was also recorded with a Polaroid camera on Time Zero film. The pictures clearly show the strong effect.

The PL spectrum of nanoparticle silica shown in FIG. 1 was measured at 77 K. (temperature of liquid nitrogen) with a SPEX Fluorolog-2 spectrofluorometer in emission and in excitation modes. The emission spectrum of the photoluminescence (MPL) was excited with 300 nm light (spectral bandwidth 5 nm), and measured between 350 nm and 700 nm with a spectral bandwidth of 1 nm. For the excitation spectrum (XPL), a wavelength of 476 nm where one of two emission maxima occurs was selected for monitoring the intensity of the PL. The wavelength of the excitation light was varied from 200 nm to 425 nm. The background spectrum for this measurement (without the nanoparticle silica) gave a photon count of less than 2% of the photoluminescence signal itself. A similar MPL spectrum was obtained at room temperature.

The origin of this surprisingly strong blue photoluminescence has not been completely identified. While not being bound by theory or explanation, it should be noted that photoluminescence has been reported with oxygen containing ultrafine particles of silicon prepared by gas evaporation techniques which are subsequently oxidized. Emission maxima were found at wavelengths at and below 470 nm depending on the oxygen treatment.

In FIG. 1, it can be seen that the MPL spectrum exhibits two broad peaks, one at 467 nm (2.65 eV) identified as the band, and the one at 422 nm (2.94 eV). These peaks are believed to be related to defects in the silica structure. It is believed that the laser ablation of Si in oxygen according to the present invention, results in a silica nanostructure with a large concentration of such defects, especially at internal surfaces, which in turn, gives rise to the observed bright photoluminescence. Removal of oxygen from silica results in Si—Si bonding across the oxygen vacancy, but on further reduction, these vacancies order into extended shear defects. The Raman spectrum of silica particles according to the invention show a strong and sharp band at 520 cm$^{-1}$ proving the existence of Si—Si bonds. An Si$_2^0$ defect model is compatible with the unusually large surface area determined for nanoparticle silica according to the invention.

Again, while not being bound by theory or explanation, it should be noted that alternative explanations for strong photoluminescence in nanoparticle systems, such as quantum confinement in silicon particles, appear not applicable in the present invention because of size considerations. Thus, substantial energy shifts sufficient for emission at 2.7 eV require particle sizes below about 4 nm which is not observed.

The following example illustrates the invention in further detail.

EXAMPLE

Figure 2:
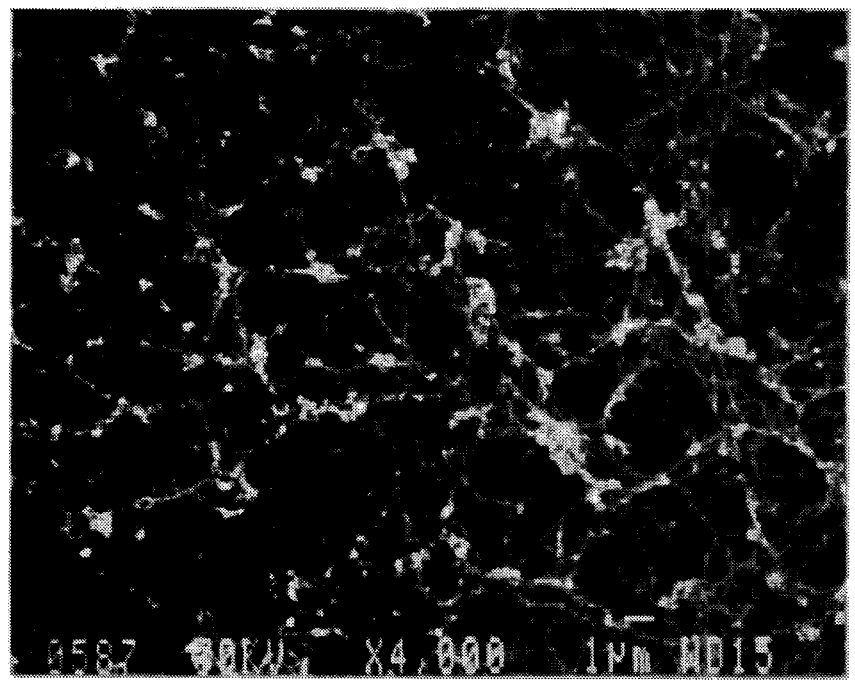
FIG. 2 is a scanning electron micrograph (SEM) obtained for silica particles synthesized according to the invention, using 20% oxygen in helium at a total pressure of 800 torr, and top and bottom plate temperatures of −100° C. and 20° C., respectively.
Figure 3:
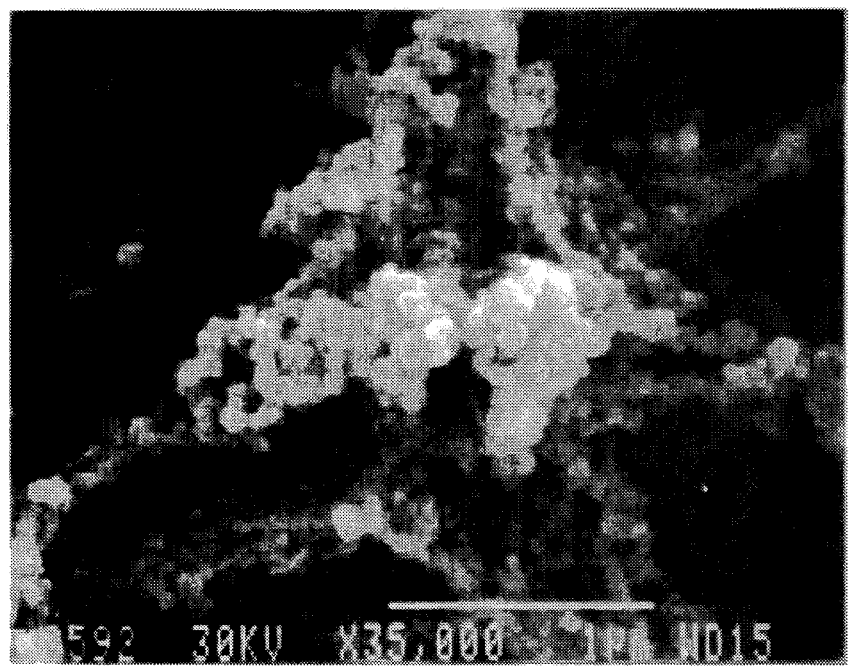
FIG. 3 is a high resolution SEM image of the silica particles shown in FIG. 2. Transmission electron microscopy (TEM) reveal a fine dispersion and a high degree of homogeneity of particle size and shape. Individual particle sizes were estimated at between 10–20 nm, suggesting a range of several hundred to a few thousand molecules per particle. This pattern is very different from other nanoparticles synthesized by conventional oven or sputtering techniques. The appearance of a web-like morphology is believed to be related to the mode of aggregation in the chamber.

An upward thermal diffusion cloud chamber was used for synthesis of the nanoscale silica particles. The principles of operation of the chamber, its design and construction, are described in detail in THE JOURNAL OF CHEMICAL PHYSICS, Volume 52, Number 9, May 1, 1970, Pages 4733–4748, which is incorporated herein by reference. In the JOURNAL on Page 4737, a cross sectional view of the diffusion cloud chamber is shown in FIG. 2. The chamber was modified to accommodate the synthesis of silica nanoparticles, and it consists of two horizontal circular stainless steel plates which are separated by a circular glass ring. A silicon metal target was seated on the bottom plate. The chamber was filled with an inert carrier gas such as pure helium or argon. The inert carrier gas contained a known concentration of oxygen as reactant gas, although other reactant gases can be employed, such as N$_2$ or NH$_3$ for producing nitrides, and CH$_4$ or C$_2$H$_4$ for producing carbides. The silicon metal target and the bottom plate were maintained at a temperature higher than the temperature of the top plate. The top plate was cooled to less than 120° C. by circulating liquid nitrogen. The temperature gradient between the bottom and top plates provided a steady convection current which was enhanced by adding argon and krypton under high pressure conditions (1×10$^3$ torr). Silicon metal vapor was generated with a pulsed laser using the second harmonic (532 nm) of a yttrium aluminum garnet-neodymium (YAG-Nd) laser (15–30 mJ/pulse). The laser vaporization released more than 10$^{14}$ metal atoms per pulse (2×10$^{-8}$s). The energetic silicon metal atoms and clusters reacted with oxygen forming vapor phase silicon metal oxide molecules and clusters. The clusters underwent collisions with the inert carrier gas and resulted in cooling by means of the collisional energy loss. Under the total pressure employed in this experiment of 800 torr, the silicon metal and the oxide clusters approached the thermal energy of the ambient gas within several hundred microns from the vaporization target. Unreacted silicon metal clusters and less volatile silicon oxide clusters were carried by convection to the nucleation zone near the top plate of the chamber where the silica nanoparticles formed. Nichrome heater wires wrapped around the glass ring provided sufficient heat to prevent condensation on the ring, and maintained a constant temperature gradient between the bottom and top plates. The particles formed in the nucleation zone and were condensed on the top plate during laser vaporization at 10 Hz for about 1–2 hours. The chamber was brought to room temperature and the particles were collected under atmospheric conditions. No particles were found in the chamber except on the top plate. Glass slides and metal wafers were attached to the top plate to examine and analyze the morphology of the deposited silica nanoparticles. The various analyses carried out on these silica nanoparticles are referred to and discussed above in detail, including the SEM, TEM, FTIR, BET, and PL spectrum, analyses.

In the regular conventional chamber, the temperature profile is a linear function of vertical distance. Since equilibrium vapor pressure $P_e$ is approximately an exponential function of temperature, the silicon oxide vapor was supersaturated in the nucleation zone near the top plate. Supersaturation can be varied and increased by increasing the temperature gradient between the two plates in the chamber. Thus, the higher the supersaturation, the smaller the size of the nucleus required for condensation. By controlling this temperature gradient, and the total pressure, as well as the laser power which determines the number density of the silicon metal atoms released in the vapor phase, the size of the condensing particles is controlled.

Nanoparticle silica according to the present invention is therefore generally in the form of a three dimensional web-like microstructure having a BET surface area of greater than 300 $m^2/g$, preferably greater than 300 $m^2/g$ to 460 $m^2/g$, most preferably 380–460 $m^2/g$. It has an emission photoluminescence spectrum exhibiting peaks at between about 380 nm to about 540 nm, but preferably about 422 nm (2.94 eV) to about 467 nm (2.65 eV). Its particle diameter is between about 5–50 nanometers, but preferably about 10–20 nanometers. The nanoparticle silica is a three dimensional web-like microstructure in a porous arrangement of aggregates with an inter-chain spacing and superstructure in the pattern of alternating areas of particles and holes.

Other variations may be made in the compositions and methods described above without departing from the essential features of the invention. The forms of the invention described are only exemplary and not intended as limitations on the scope of the invention defined in the claims.

That which is claimed is:

1. A porous material in a three-dimensional web structure of fused together silica nanoparticles of a diameter of between about 5–50 nanometers, having a BET surface area greater than 300 $m^2/g$ to 460 $m^2/g$, and an emission photoluminescence spectrum exhibiting peaks at between about 380 nm to about 540 nm.

2. A porous material in a three-dimensional web structure of fused together silica nanoparticles of a diameter of between about 10–20 nanometers, having a BET surface area of between about 380–460 $m^2/g$, and an emission photoluminescence spectrum exhibiting peaks at between about 422 nm to about 467 nm.

* * * * *

UNITED STATES PATENT AND TRADEMARK OFFICE
CERTIFICATE OF CORRECTION

PATENT NO. : 5,580,655

DATED : December 3, 1996

INVENTOR(S) : Mohammed S. S. El-Shall, Daniel Graiver, and Udo C. Pernisz

It is certified that error appears in the above-identified patent and that said Letters Patent is hereby corrected as shown below:

On the title page, item [73], should read as follows:
Assignee: Dow Corning Corporation, Midland, Michigan, and Virginia Commonwealth University, Richmond, Virginia.

Signed and Sealed this

Fourth Day of November, 1997

Attest:

BRUCE LEHMAN

Attesting Officer

Commissioner of Patents and Trademarks